Patented June 3, 1952

2,599,519

UNITED STATES PATENT OFFICE 2,599,519

CITRUS JUICE PRODUCTS HAVING STABILIZED CLOUD AND PROCESS FOR MAKING THE SAME

Jesse W. Stevens, Upland, and David E. Pritchett, Ontario, Calif., assignors to Sunkist Growers, Inc., Los Angeles, Calif., a corporation of California No Drawing. Application October 29, 1949, Serial No. 124,486

14 Claims. (Cl. 99—155)

1

This invention relates to the maintenance of good appearance of citrus juice beverages and particularly to the maintenance and even improvement of the cloudy appearance which is such an inherently natural characteristic of freshly prepared citrus juices and such a desired characteristic of citrus juice beverages.

After it had been shown to be possible to maintain a natural looking cloud in citrus juice products, i. e., citrus juices and citrus juice beverages, it was at first thought that all that was needed was to inactivate the flocculating enzymes before they had adversely affected the natural cloud. It is now definitely established that this is not sufficient. Cloud is frequently found to be flocculating, apparently in the entire absence of enzymes. We have now made the surprising discovery that such non-enzymatic flocculation can be avoided and even that such non-enzymatically flocculated cloud can be restored to a substantially natural condition of suspension by embodying in the citrus juice product substances of the narrowly restricted group identified as water soluble gums of high mannogalactan content and of which group guar gum, locust bean gum, and tara gum are the only representatives that we have been able to find available. None of these gums are known to be present in any citrus fruit. We have made the astonishing discovery that the cloud is well stabilized against non-enzymatic flocculation by the use of proportions of these substances so extremely minor that it is utterly impossible that any viscosity change can be involved in the production of the effect and it even seems most unlikely that any suspensoid action of the usual type can be responsible for the maintenance or restoration of the stability of the cloud.

By the term "cloud" herein we mean throughout that naturally occurring turbidity of appearance which is comprised of more or less colored particles, ranging all the way from microscopic down to colloidal in size and at least temporarily suspended fairly uniformly throughout freshly prepared citrus juices and which can be maintained in fairly stable condition, except for the natural slow settling of larger particles under conditions of relatively complete quiet, for quite long periods of time.

By one of those peculiar contradictory quirks of language that sometimes happen, the term "clouding up" has in recent years come, among some who work in a practical way in the fabrication, distribution, and merchandising of citrus juices and citrus juice beverages, to mean and designate the undesired lumping up, conglomeration, coagulation, separation, and/or settling out of the wanted natural turbidity that sometimes occur in citrus juices and citrus juice beverages

2 and which it is one of the aims of the present invention to prevent or correct. That use of this term is almost diametrically opposed to the meaning we intend by the term "cloud," and is not used by us herein. Neither do we intend here to include within the meaning of the term "cloud" any of those artificial turbidity producing substances sometimes added to citrus beverages to cause them to appear artificially and superficially to have a juice content that is not actually present to the extent indicated by the appearance of the beverage.

The fact of the possibility, as a commercially operable proposition, of maintaining the natural cloud of citrus juices and citrus juice beverages in relatively stable form was originally discovered and first demonstrated by one of us nearly twenty years ago. See United States Patent No. 2,217,261 to Jesse W. Stevens, original application filed December 12, 1931. Stemming from that discovery, the production, distribution, and merchandising of citrus juices and citrus juice beverages having a cloudy appearance have spread to and been adopted in all those parts of the world in which citrus juice products are manufactured. Citrus juices and citrus juice beverages possessing a cloudy appearance have met with such wide public acceptance and have become so firmly established that it has become an absolute commercial necessity for them to have that cloudy appearance. This, in turn, has itself given rise to some surprising difficulties.

These difficulties have exhibited themselves primarily as deficiency and instability of the cloud. The more serious trouble results from the instability, i. e., the tendency of the natural cloud to settle out rapidly upon standing. This difficulty will be particularly obvious and is most important commercially, in connection with bottled beverages which contain a proportion of citrus juice and are put up in glass. When those beverages exhibit a natural cloudy appearance they are, of course, particularly pleasing to the prospective consumer, and they are relatively unattractive if the natural cloud has settled out after having first undergone flocculation. The trouble is caused, presumably, by what we believe to be a non-enzymatic flocculation process which takes place in the bottled beverage after bottling. This flocculation is found to take place in beverages made from juices treated in accordance with the process disclosed in U. S. Patent No. 2,217,261. That process, we believe, destroys or completely inactivates the enzymes; and this leads us to believe that the flocculation which is prevented by our present invention is non-enzymatic in character. The formation of visible flocs in the bottled beverage can sometimes be observed in as short a time as from one to four hours after bottling, particularly if the bottles are at rest. The flocs settle to the bottom of the bottle and form an unsightly layer of sediment. The cloud can usually at first be apparently completely redispersed by agitation but upon standing the cloud will again gather into flocs and settle, as in the first instance. The sediment layer tends to acquire a relatively greater solidity with time and becomes more difficult to redisperse by agitation. Any such tendency of the sediment to solidify is, of course, very objectionable to those who are putting up the finished beverages and offering them for sale.

Non-enzymatic flocculation in citrus juice products generally, and as particularly to be observed in bottled citrus beverages, has apparently been more prevalent in recent years. It is not definitely known what causes this; whether or not it may possibly be due to some variation in the quantity of some minor element or constituent in the fruit, due possibly even to such a remote cause as long range changes in weather cycles or to seasonal variations therein, due to possible gradual exhaustion of soils as to some partiucular constituent or element, arising from the fact that a particular citrus orchard necessarily grows upon the same soil over a very long period of years, or due possibly to changes in the manner of handling and processing the fruit.

In some procedures for extracting the juice, the fruits are cut in half, the halves are grasped in cup-shaped devices, and the juice is removed by a process or operation commonly called "reaming" or "burring," all of which is done mechanically and very quickly with little or no expressing or macerating manipulation of or action upon the peel portion of the fruit, which remains as a half fruit substantially unaltered except for the removal from it of the juice. These pieces, commonly called "half shells," are separately discharged from the machines. In another method now finding some use, the whole fruits are each penetrated by a perforated tube having sharpened edges and then, while the tube is maintained in place, the individual fruit is squeezed together so that it is caused to collapse and the juice is pressed out through the tube. The juice is separately discharged from the machine. Although the individual friuts are, in this instance, fairly completely mashed, the juice does not come into contact with these mashed fruits. A small disc or "plug" of the peel is pressed out through the tube with the juice, from each fruit operated upon. These are removed by a screen over which the juice flows. In both of these cases, there is no or very little opportunity for the incorporation of any sort of peel constituents and any resultant additional cloud substances into the juice.

It should be appreciated that some modifications of the extraction processes are capable of producing the result of having a relatively small amount of natural cloud in the juice product to begin with. Even in such cases, good stability of the natural cloud is an important desideratum. While the following out of the process of U. S. Patent No. 2,217,261 is understood to avoid enzymatic flocculation of the cloud, there still remains the problem of counteracting non-enzymatic flocculation. It is to this difficulty and problem that the present invention is addressed.

In accordance with the above mentioned United States Patent No. 2,217,261, the juice is preferably, immediately following extraction from the fruit, rapidly heated to a predetermined temperature, held at that temperature for a predetermined time, and then rapidly cooled. This procedure, which destroys or inactivates the naturally occurring enzymes that would otherwise deleteriously modify the cloud suspending substances, has become universally adopted.

It should be clearly and fully understood that in the cases of the juice products which we have had under consideration in connection with the above discussion, the principal difficulty has been in connection with the sufficiency of the suspension, and the sufficiency of the stability of the suspension of the naturally occurring cloud producing substances in the beverages comprised of or containing such juice products.

It may, perhaps, be hypothesized that the relative instability of the cloud in a particular juice product may be due to the fact that any treatment to which the juice, along with the undissolved solid substances carried by it, has been subjected has created new surfaces of such solid material which demand more cloud suspending substances to produce a satisfactory stabilizing action upon the cloud producing substances than are inherently present in the juice.

Sound theoretical understanding of the fundamentals of the causes of the instability of the cloud suspension would be highly important as assisting in pointing toward a solution of the difficulty.

Regardless of theory as to the causes of the instability of the cloud suspension, it became a practical commercial necessity to discover some means of reestablishing the relative permanence of suspension of the natural cloud in citrus juice products.

The usual run of substances commonly known as "protective colloids" failed to produce any satisfactory improvement. Indeed many of these substances are found to act as precipitants for the cloud suspension.

We have found that there is a small group of substances capable of counteracting the above type of flocculation, which we have referred to herein as non-enzymatic. This is the group of water soluble gums characterized by having a high mannogalactan content.

As is not unusual with naturally occurring substances, the precise chemical make-up of these water soluble, high mannogalactan gums is not fully known. Moreover, a number of naturally occurring gums have been reported as belonging to this group. Many of these remain to be verified as to their true character and as to their being actually and properly so classified. This should not be considered surprinin, in view of the tremendous volume of technical and scientific literature, and further in view of the very regrettable fact that all too frequently some author will publish as facts what are actually little better than mere guesses. Also, very many naturally occurring substances are present in some of their source materials in such extremely small quantities that they can, for economic reasons, never be considered as anything more than scientific curiosities.

Of the water-soluble, high mannogalactan gums, three representatives are available in some quantity. These are guar gum, locust bean gum, and tara gum. We desire to make it clear at this point that we do not herein distinguish between locust bean gum and locust kernel gum. While a distinction is sometimes drawn in the technical literature and in the trade, based upon very minor differences in quality or other characteristics probably arising from differences in the processes and the care used in their preparation, they must, for over all practical purposes, be regarded as one and the same thing, which we designate herein by the commonly used term, "locust bean gum."

Guar gum is derived from the beans or seeds of the plant called "guar," an annual plant of the Leguminosae, apparently the species identified as *Cyamopsis tetragonoloba* (Taub.), The Standard Cyclopedia of Horticulture, L. H. Bailey, The Macmillan Company, or possibly *Cyamopsis psoralioides*, Webster's New International Dictionary, Second Edition.

Locust bean gum is derived from seeds of the well known and extensively grown *Ceratonia siliqua* (Linn.) and is widely produced and extensively used in industry.

Tara gum appears to be derived from *Caesalpinia spinosa*.

*Ceratonia siliqua* and *Caesalpinia spinosa* are also members of the Leguminosae. This is a very extensive family.

The derivation of the gum from its source material and its preparation for use form no part of the present invention.

It will be seen at once that, as an intensely practical problem, the problem of the stability of the natural cloud against the above non-enzymatic flocculation arises primarily in connection with citrus juice products put up in glass containers. Usually, the products so handled are beverage products containing less than a major proportion of citrus juices.

So far as natural strength citrus juices themselves are concerned, current commercial practice tends very strongly toward putting these up in tin cans. The contents of such a can are not visible to the prospective consumer. It is a very simple matter to shake such a can slightly before opening it. Indeed, it is not easy to open the can and discharge the contents without giving the juice removed from it quite a good stirring. This juice is then usually promptly served and promptly consumed. Thus there is little opportunity for the cloud to settle again. While our discovery is equally applicable in this field, it seems to us, at present, less important commercially. We shall, therefore, direct our description to the use of the discovery in connection with the production of bottled beverages.

It will be appreciated from what has been said above as to the sources of the three gums, guar gum, locust bean gum, and tara gum, that locust bean gum is much more widely available commercially. Also, we find that, when the quantities used are reduced to something approaching minimal amounts, locust bean gum appears to be more effective in sustaining the suspension of the cloud than either guar gum or tara gum. We have some evidence that tara gum is somewhat superior to guar gum and perhaps nearly as effective as locust bean gum. All of these are markedly superior to any of the many other substances that we have examined experimentally. We shall describe specifically the utilization of locust bean gum.

With regard to the amount of gum to be employed, the significant proportion seems to be the proportion of gum in the final bottled beverage. The amount used may be extremely small. For example, in connection with a lemon juice beverage bottled by a formula very extensively used at present and which results in the equivalent of slightly more than 5% of lemon juice in the final beverage, we find that a very marked increase in the stability of the cloud suspension may be obtained with as little as one part per million of the gum in the beverage. Obviously, some improvement in the extent of stability would be expected and is, in fact, usually obtained to some extent by an increase in the amount of gum over this extremely small proportion. However, in many of the beverages which we have tested, an increase in the amount of gum up to about 10 parts per million appears to give the maximum amount of increase in the stabilization of the cloud; that is, it gives about as much stability to the cloud as can be achieved by still further considerable increases.

The amount of gum preferably to be employed will depend upon the juice. With a juice in which the cloud has become strongly destabilized, more gum may be added before reaching approximately the maximum level of stability of the cloud than with a juice that has not had its cloud so strongly destabilized.

Likewise, we found, when we doubled the juice content in the final beverage, that very small amounts of gum resulted in marked improvement but that slight further improvements in the stabilization of the cloud could be observed up to as much as 20 parts per million of gum in the beverage.

We desire to make it clear that we do not claim to make the cloudy appearance better in a juice or juice product that already has a cloud that is naturally good and that has not become destabilized. In other words, our invention does not result in juice products which falsely appear to have a content of citrus juice over and above what is actually present. Neither, indeed, do we fully restore or permanently retain, once the cloud has become rather fully destabilized, a density of cloud entirely equal to the density of cloud that would be exhibited in, for example, a bottled beverage freshly made up from that same juice prior to the occurrence of any destabilization of the cloud. We do, however, accomplish what have been found to be very important improvements commercially, and we are able to retain in suspension after twenty-four hours storage at complete rest, from about eighty per cent up to as high as ninety-five per cent (measured by means of a colorimeter) of the original complete density of cloud that the particular juice is capable of supplying under the particular conditions of use.

Various methods of adding the gum may be employed, and it may be added at various stages in the manufacture of the beverage. One important point is to see to it that the gum has full opportunity to become thoroughly hydrated.

These gums are usually available as a finely divided dry powder. Having in mind the importance of seeing to it that the gum has an opportunity to become fully hydrated, we prefer to form a sol of the gum in water prior to its addition to the juice product. One very satisfactory way to do this is first to disperse the finely powdered gum in the water by dusting it lightly onto the surface of cold water while the latter is maintained in a condition of rapid agitation. After this, the water may be boiled for a time or heated to near boiling and left at that temperature for as much as two or three hours. We do not attach particular significance to these details of procedure. We simply point out that we prefer to assure the complete hydration of the gum, since by doing so, we secure a more satisfactory stabilizing action by the use of the same amount of gum or, conversely, an equally satisfactory improvement in the stability of the cloud while using a smaller proportion of gum.

Wherever, herein and in the appended claims, we refer to these gums as being in solution it is to be understood that we recognize that the gum will actually be present in sol form, since it is undersood that these substances do not pass into true solution, but form only colloidal solutions or sols.

The preferred amount of gum to be used in making up the sol is to some extent a matter of choice. Locust bean gum in equivalent proportions seem to form somewhat more viscous sols than are formed by the guar gum and tara gum that we have examined. Sols containing as high as five per cent by weight of locust bean gum (equivalent to fifty thousand parts per million) are found to possess a heavy viscosity such they would not ordinarily be used. We have found a sol containing one per cent by weight of locust bean gum to be very convenient and satisfactory for use. Its viscosity is sufficiently low that it presents no problem at all in measuring or handling and is readily dispersed into the other liquids to be embodied in the final syrup or beverage, at any desired point. It blends well and the securing of uniformity of mixture in the various parts of the mix does not become a problem. Likewise, by the use of this particular concentration all steps of calculation are reduced to the simplest possible terms, both the calculations for making up the sol, and the calculation with respect to the amount of sol to use to obtain a desired final proportion of the gum. Thus the possibilities of error are reduced to a minimum.

As a further illustration of the effects of the completest possible hydration of the gum, we have found that, using the same final proportions of all other ingredients in the final beverage, we get improved results by adding the gum as a sol of 0.1% concentration over the results given by the use of a sol of 1% concentration. This improvement is manifested both by improved stability of cloud suspension at the same final gum proportions and by equivalent stability of cloud suspension at lower gum concentration, in the cases of the beverages for which the gum sol used, was of 0.1% strength.

The point in the manufacture of the beverage or of the fountain syrup at which the gum sol is added is likewise to a considerable extent a matter of choice.

In the manufacture of bottled beverages containing less than a major proportion of citrus juices, there are, as now commonly practiced commercially, a number of stages at which some definite liquid product is being handled. The gum sol can actually be added at any of these stages. These stages as usually identifiable are: (a) extraction of the juice, (b) heat treatment or pasteurization of the juice for enzyme inactivation, (c) concentration of the juice, (d) fabrication of the beverage base, (e) making up simple syrup, (f) mixing the beverage base and the simple syrup to form the bottling syrup, and (g) bottling the final beverage. Obviously it will not always be possible to separately identify each of these steps in a particular procedure.

In the absence of any factors which predominantly indicate another course, we prefer to add the gum as a sol and either to add it to the juice prior to or during the concentration step or to add it to the concentrated juice during the fabrication of the beverage base, i. e., either at step (c) or at step (d) above. We call particular attention to the fact that, at whatever stage the gum sol be added, it is of paramount importance to see to it that a thorough intermixture of the gum sol with, and dispersion into, the other liquid constituents is accomplished.

While the gum sol is added to the juice product prior to or during the concentration step, and then the processing of the juice product is carried on in such a way as to bring the concentrated product to some predetermined percentage content of soluble solids, the addition of the gum sol prior to the concentration step avoids the necessity of any adjustment in the calculation to allow for the aqueous phase of the gum sol and, in effect, permits the subsequent removal of the water added with the gum. It will be understood from what has been said above that these are matters of convenience only and not matters of compelling necessity.

When the gum sol is added during the fabrication of the beverage base, results that seem to us fully equal in satisfactoriness are obtained, with equal convenience, and without any modification in the equipment ordinarily used for such purposes. In the case of the addition of the gum sol during or prior to the concentration step, the agitation normally attendant upon concentration will insure complete dispersal of the gum sol into and its intermixture with the other constituents. In other cases, including the addition during fabrication of the beverage base, adequate mechanical agitation or other means must be employed to insure full and entire intermixture. Quite possibly the improvement formerly referred to as being obtained by addition of the gum as a 0.1% sol instead of as a 1% sol is partly attributable to the fact that the sol of lower strength will be more readily stirred or otherwise mixed to a state of complete uniformity of intermixture.

Because of the fact that these gums do have an important effect upon viscosity at concentrations that are relatively high as compared to the infinitesimal amounts that we find satisfactory in the final beverage products, this effect upon viscosity being particularly noticeable in the presence of considerable quantities of dissolved solids such as the sugars and acid of the citrus juices, there is a limitation upon the amount of the gum that can be incorporated in concentrated beverage bases and other concentrated juice products. For example, with a concentrated lemon beverage base intended for use by bottlers, which base contains approximately forty-five per cent of dissolved solids, we find that the proportion of about 0.3% of locust bean gum by weight in the concentrated base itself is about as high as we would prefer to go, having in mind the desired ease and convenience in handling the beverage concentrate. This is an amount which is considerably more than ample, as will be seen from the fact that if from such a base a final beverage be prepared which has an equivalent of about 5.2% of lemon juice in the finished beverage, the finished beverage will then contain 36 parts per million of the gum and, as indicated above, little or no improvement of cloud in such a beverage was obtained by increasing the gum content above about 10 parts per million of gum, with respect to the beverage. Concentrations of gum up to, and considerably above, 36 parts per million in the final beverage are insufficient to materially increase the viscosity thereof.

Where it is desired to incorporate the gum into a beverage prepared from a base that has already been made, it will, of course, be a comparatively simple matter to incorporate the gum sol as the bottling syrup, or even as the beverage itself, is being compounded. In either of such cases the importance of securing thorough intermixture must necessarily be carefully observed.

We desire to point out that we have observed two types—or perhaps we should say causes—of non-enzymatic flocculation of the cloud which are not normally observed in making, for example, a citrus juice beverage with the juice product at the time the processing of the juice has been completed. These two types appear to present instances of flocculation that are not always completely avoided by the use of gum in accordance with the present invention. However, in both of them the utilization of the gum has been shown to be of great advantage and ordinarily produces sufficient improvement that the commercial preparation and distribution and sale of beverages under these particular conditions can be carried on with full satisfaction.

One of these appears to be induced by the use of waters in or from certain localities. The use of the gum in this instance results in improved suspension of the cloud which is otherwise susceptible of being fairly completely flocculated in a relatively short storage time by constituents of the water.

The other may be thought of as arising within the juice product itself, although it is not present at the time the processing of the juice has been completed. It has been found in the study of citrus juices that citrus juice products high in acid content, as lemon juice is, undergo some change during long storage, especially at higher temperatures, which eventually will cause the cloud to become fairly completely unstable. This change in the juice product is evidenced by flocculation of the cloud when the juice product is diluted to beverage strength. This destabilization of the cloud by aging is hastened by exposure to high temperatures during the storage and probably also by exposure to excessive heat during manufacture. The same process goes on at a lower temperature but at a much slower rate. It is important to note, however, that lemon juice products will usually be too dark in color for commercial use before a critical amount of destabilization has occurred by reason of aging. As indicated above, the gum does not completely prevent this destabilization by aging. It does, however, retard the process very definitely or, perhaps more correctly stated, compensates for it and thereby prolongs the storage life of the concentrated juices. It does not reduce the rate of darkening. Consequently, the effect of the addition of the gum is to tend to carry the storage life of the juice product, from the standpoint of stabilization of the cloud, over into the period or condition in which the juice product will have become unacceptable commercially because of the darkening of the color. It will be understood that this form of destabilization is not normally important and comes into play only under conditions where it may have proved necessary or desirable to store some high acid citrus juice product for a very considerable period of time.

As we have indicated above, considerable variation is possible with respect to the amount of gum to be employed. To some extent this is a matter of choice and it permits the selection of a proportion of gum that will insure success under the greatest variety of conditions that may be encountered, without incurring the likelihood of encountering any conditions under which the proportion of gum utilized would be expected to give rise to any difficulty. There are, of course, some factors which tend to be limiting. We have already indicated in a general way what these factors are. When, as is the usual commercial practice, a beverage is to be prepared from a base that has already been fabricated and the gum is added either at the original concentration of the juice stage or at the stage of the fabrication of the beverage base, then the maximum amount of gum that will admit of convenient and satisfactory handling of the concentrate or of the beverage base with gum present in it will be the limiting factor. This will not be the same for all conditions of handling, there being, for example, different problems connected with filling into gallon size tin cans and filling into gallon bottles, as is common in the case of certain types of beverage bases, and particularly fountain syrups. Neither will this limiting factor be found to be precisely the same in the case of different types of equipment. Also, it will necessarily vary, dependent upon the concentration of dissolved solids in the concentrate or the base. As we have said above, when working with a common type of lemon beverage base which contains approximately 45% of dissolved solids, we find about 0.3% of gum in the base to be as much as we desire to have present.

While higher acid citrus juices, such as lemon, which, in addition to being higher in acid, are also normally lower in their density of natural cloud, exhibit more frequently a sufficient destabilization of cloud from non-enzymatic causes than do the lower acid, higher natural cloud citrus juices such as orange juice, nevertheless this difficulty does present a serious commercial problem with orange juice. The usual commercial practice is to carry the soluble solids content to a higher precentage in the concentration of orange juices than is done with lemon juice. Likewise the common commercial practice is to fabricate orange juice beverage bases at a higher soluble solids percentage than is done with lemon juice beverage bases. Consequently, all other things being equal, the maximum proportion of gum that can be embodied with ease and convenience in such higher soluble solids concentrates and bases will be relatively lower. It is common to prepare orange puice concentrates so that the percentage of dissolved solids is about 65% by weight, or even as high as 72% by weight, while orange juice beverage bases are often so fabricated that they have a dissolved solids content of 60%. With products of such high solids content, we consider a gum content of 0.1% to be fairly high. If the gum content is as high as 0.2%, products of such high solids concentration become rather difficult to handle satisfactorily.

When products of relatively high solids concentration also contain relatively higher (although proportionately still very low) amounts of gum, it is to be expected that a certain amount of gelation will occur, and this will actually be observed in many such cases. This is undoubtedly due to the substantial dehydrating effect the dissolved solids have upon the colloidal gum sol. Such gels are harder to handle in fabricating a juice concentrate or beverage base into another form of product, because of the prolonged stirring necessary to disperse the gelled material fully and the time required to insure sufficiently complete rehydration of the partially dehydrated gum substance that constitutes the gel. Accordingly, we ordinarily prefer to keep the gum content low enough to avoid gel formation completely or, at least, to give only a very weak gel.

In the finished beverage, extremely small amounts of gum give a truly beneficial effect. With a finished lemon juice beverage having approximately 5% lemon juice equivalent, one part per million of gum gives good cloud suspension, while some improvement is observed by increasing the gum, up to as high as about ten parts per million. Any increase above this is apparently merely insurance provided against the possibility of encountering some unusually unfavorable condition. Again, working with a series of orange juice beverages in which the final finished beverage contained approximately the equivalent of 13% of orange juice, we found that three parts per million of gum in the finished beverage gave a substantially major part of the potential improvement in the stability of suspension of the cloud. In some cases, increase in gum content up to about nine parts per million gave some further improvement and about all the improvement that could be obtained by larger amounts, while in other cases, increase in the gum content up to fifteen parts per million gave still some slight further improvements. In all of these instances, ranging all the way from original natural strength juices through concentrates, bases, syrups, and finished beverages, as throughout all the variations in the practice of our invention, the gum is present as indeed a very small proportion relative to the other non-aqueous constituents of the citrus juice product; and we designate this very small relative proportion by referring to the gum as being present as a minor constituent.

We find that a very convenient "rule of thumb" guide is to have the gum present in the concentrate, in the beverage base, or in the syrup, in such a proportion that there will be present in the final finished beverage one part per million by weight of gum for each percent of juice equivalent, by volume, that is present therein. This "rule of thumb" guide assumes, of course, that the final finished beverage will take the form of a citrus juice beverage having from, say, about 5% up to about, say, 15% juice equivalent by volume, and allows a reasonable average or "margin of safety" in the proportion of gum. We do not know of any conditions, or causes, of cloud instability that will be encountered that would require maintaining the same relatively high margin of safety in the case of a concentrate intended for dilution back to the equivalent of 100% juice.

The following specific examples will, by way of illustration only and not by way of limitation, exhibit the application of our invention, in accordance with the foregoing disclosures, to the preparation of particular citrus juice products:

EXAMPLE 1

*Lemon juice beverage*

A beverage base is compounded of ingredients, as follows:

| | | |
|---|---|---|
| Concentrated lemon juice | gallons | 264.2 |
| Concentrated orange juice | do | 26.0 |
| Sodium citrate (2H$_2$O) | lbs | 35.3 |
| Sodium benzoate | lbs | 55.8 |
| Locust bean gum | lbs | 1.43 |
| Water (approx.) | gallons | 37.0 |

The concentrated lemon juice contains 340 grams of citric acid, calculated as anhydrous, per liter. The concentrated orange juice is 72° Brix. Both products have, during the course of their manufacture, been heat treated to inactivate enzymes, in accordance with U. S. Patent 2,217,261. The sodium citrate is added for the purpose of improving the taste-body of the flavor. The sodium benzoate acts as a preservative and is present in the base in sufficient quantity to supply the desired amount in the final beverage. The locust bean gum is added in the form of a sol of desired strength, such as 1%, either to the lemon juice prior to or during the manufacture of the concentrated lemon juice or it is added during the actual compounding of the beverage base. In the latter case, the water added as part of the gum sol either constitutes or is deducted from the total amount of added water specified.

These ingredients are compounded together in known manner in a suitable apparatus, such as a glass lined tank provided with an agitator. A mixed batch of beverage base is obtained of approximately 331.1 gallons in volume and 3316.2 lbs. in weight.

Composition of base (by calculation):

| | | |
|---|---|---|
| Soluble solids concentration | degrees Brix | 44.6 |
| Citric acid, as anhydrous | per cent | 23.1 |
| Juice content equivalent | volumes | 4.95 |
| Gum | per cent | 0.043 |

By the expression "juice content equivalent" we mean, as applied to the particular instance, that the base contains substances, except for water evaporated during concentration, actually derived directly from citrus fruit juices by concentration and equivalent to a volume of original juice 4.95 times the volume of the base.

The above base may then be utilized in the following.

Bottling syrup formula:

| | | |
|---|---|---|
| Base, from above | gallons | 1 |
| Sugar syrup, 32° Bé | do | 17 |
| Flavor extract and color, q. s., or | fl. oz | 3 |

This syrup is mixed and compounded in known manner. The beverage, in this example, is then bottled into 12 oz. bottles, with the throw of the above syrup adjusted to 2¼ oz. of syrup per bottle, and at the same time carbonated, as desired.

Composition of beverage (by calculation):

| | | |
|---|---|---|
| Soluble solids concentration | degrees Brix | 13.3 |
| Citric acid, as anhydrous | per cent | 0.28 |
| Sodium citrate (2H$_2$O) | do | 0.013 |
| Sodium benzoate | do | 0.02 |
| Juice equivalent, by volume | do | 5.2 |
| Gum (approx.) | p. p. m | 5 |

This beverage will be found to have an excellent cloud retention and stability, even though the concentrates exhibit strong destabilization of the cloud in a corresponding beverage made up without the gum.

EXAMPLE 2

*Orange juice beverage*

A beverage base is compounded of ingredients, as follows:

| | | |
|---|---|---|
| Concentrated orange juice | gallons | 246.1 |
| Flavoring substances | lbs | 20 |
| Citric acid, crystalline (average) | lbs | 201.1 |
| Locust bean gum | lbs | 1.41 |

The concentrated orange juice used in this case, is 65° Brix, and has during the course of its manufacture been heat treated to inactivate enzymes in accordance with U. S. Patent 2,217,261. The locust bean gum is preferably added in the form of a sol of 1% strength, or of other suitable strength. Since the formula as given above does not call for added water, the gum sol may be added to the juice during or prior to the concentration step. It is also possible to modify the formula sufficiently to permit the addition of a gum sol of relatively high concentration, such as 3%, to the batch. Another possibility is to mix the dry powdered gum directly into the concentrate or a portion of it, during rapid agitation. However, we do not prefer this latter procedure unless time can be allowed at a later stage after more water has been added to permit satisfactorily complete hydration of the gum.

These ingredients are compounded together in known manner in a suitable apparatus, such as a glass lined tank provided with an agitator. A mixed batch of beverage base is obtained of approximately 264.2 gallons in volume and 2,924.4 pounds in weight.

Composition of base (by calculation):

Soluble solids concentration_degrees Brix__ 66.7
Citric acid, as anhydrous_____per cent__ 11.3
Juice content equivalent_____volumes__ 6.08
Gum _____per cent__ 0.048

The above base may then be utilized in the following:

Orangeade formula:

Base, from above_____gallons__ 1
Sugar, dry sucrose_____lbs__ 38
Water _____gallons__ 36.2

This syrup is mixed and compounded in known manner and should yield approximately 40 gallons of an orangeade type of beverage. In present commercial practice this beverage is ordinarily filled into and distributed commercially in containers of the same type as are used to distribute milk. The beverage does not contain a preservative and requires approximately the same care in handling, as well as promptness of use, as fresh milk.

Composition of beverage (by calculation):

Soluble solids concentration_degrees Brix__ 12.9
Citric acid, as anhydrous_____per cent__ 0.36
Juice equivalent, by volume_____do____ 15.2
Gum (approx.)_____p. p. m__ 15

This beverage will be found to have an excellent cloud retention and stability, even though the concentrate from which it is made exhibits strong destabilization of the cloud in a corresponding beverage made up without the gum.

EXAMPLE 3

*Orange juice beverage*

A beverage base is compounded of ingredients, as follows:

Concentrated orange juice_____gallons__ 166.4
Citric acid, crystalline (average)_pounds__ 223.5
Flavoring substances_____do____ 63.7
Sodium citrate (2H₂O)_____do____ 18.5
Sodium benzoate_____do____ 44.9
Water (approx.)_____gallons__ 69.6
Locust bean gum_____lb__ 0.97

The concentrated orange juice used in this case, is 65° Brix, and has been heat treated to inactivate enzymes. This sodium citrate is added for the purpose of improving the taste-body of the flavor. The sodium benzoate is present in the base in sufficient quantities to supply the necessary preservative in the desired amount in the final beverage. The locust bean gum is added in the form of a sol of desired strength and the water so added, either constitutes or is deducted from the total amount of added water specified.

These ingredients are compounded together in known manner in a suitable apparatus, such as a glass lined tank provided with an agitator. A mixed batch of beverage base is obtained of approximately 264.2 gallons in volume and 2,759.1 pounds in weight.

Composition of base (by calculation):

Soluble solids concentration_degrees Brix__ 53.9
Citric acid, as anhydrous_____per cent__ 11.0
Juice content equivalent_____volumes__ 4.11
Gum _____per cent__ 0.035

The above base may then be utilized in the following.

Bottling syrup formula:

Base, from above_____gallons__ 1
Sugar syrup, 32° Be'_____do____ 17

This syrup is mixed and compounded in known manner. The beverage, in this example, is then bottled into 12 oz. bottles, with the throw of the above syrup adjusted to 2¼ oz. of syrup per bottle, and at the same time carbonated, as desired.

Composition of beverage (by calculation):

Soluble solids concentration
  degrees Brix__ 13.4
Citric acid, as anhydrous_____per cent__ 0.14
Sodium citrate (2H₂O)_____do____ 0.008
Sodium benzoate_____do____ 0.02
Juice equivalent, by volume_____do____ 4.2
Gum (approx.)_____p. p. m__ 4

This beverage will be found to have an excellent cloud retention and stability even though the concentrate from which it is made exhibits strong destabilization of the cloud in a corresponding beverage made up without the gum.

It should be understood that in the foregoing examples the formulas are based on commercial practice in manufacturing establishments in which the metric system of measurement is used for the calculation and fabrication of products of this sort. In Example 1 the amount of concentrated lemon juice ordinarily employed is 1000 liters while in Example 2 and Example 3 the batches are calculated to finish at 1000 liters, or 264.2 gallons in each case. In the presentation of these examples herein, the values have been calculated over to the English system of measurement in pounds and gallons.

Numerous variations in procedure will suggest themselves to those who are skilled in this art, in the application of the present invention to the widely differing details of manipulation that are characteristic of commercial practices in this field, all without departing from the fundamentals of the invention.

We may point out that we have not developed any hypothesis that satisfactorily links the high mannogalactan content of the efficacious gums with their efficacy for our particular purpose. Nevertheless, it is clearly apparent that it is this distinguishing characteristic of having a high mannogalactan content that differentiates the effective gums from the non-effective gums and other non-effective substances.

Having thus fully disclosed the nature of our invention and the methods of making and using it, we claim as our invention and desire to secure by Letters Patent the following:

1. A method of improving the natural cloud of a citrus juice product which comprises incorporating in the juice product in solution therein, as a minor constituent thereof, insufficient to materially increase the final beverage viscosity, a water soluble gum of high mannogalactan content, whereby a relatively high permanence of stability of suspension of the natural cloud producing substances present in said juice product is imparted thereto.

2. A method of improving the natural cloud of a citrus juice product which comprises incorporating in the juice product in solution therein, as a minor constituent thereof, insufficient to materially increase the final beverage viscosity, a water soluble gum of high mannogalactan content of the class consisting of locust bean gum, tara gum, and guar gum, whereby a relatively high permanence of stability of suspension of the natural cloud producing substances present in said juice product is imparted thereto.

3. A method of improving the natural cloud of a citrus juice product which comprises incorporating in the juice product in solution therein, as a minor constituent thereof, insufficient to materially increase the final beverage viscosity, the water soluble gum of high mannogalactan content, locust bean gum, whereby a relatively high permanence of stability of suspension of the natural cloud producing substances present in said juice product is imparted thereto.

4. A method of improving the natural cloud of a citrus juice product which comprises incorporating in the juice product in solution therein, as a minor constituent thereof, insufficient to materially increase the final beverage viscosity, the water soluble gum of high mannogalactan content, tara gum, whereby a relatively high permanence of stability of suspension of the natural cloud producing substances present in said juice product is imparted thereto.

5. A method of improving the natural cloud of a citrus juice product which comprises incorporating in the juice product in solution therein, as a minor constituent thereof, insufficient to materially increase the final beverage viscosity, the water soluble gum of high mannogalactan content, guar gum, whereby a relatively high permanence of stability of suspension of the natural cloud producing substances present in said juice product is imparted thereto.

6. A citrus juice product containing, as a minor constituent thereof, insufficient to materially increase the final beverage viscosity, a water soluble gum of high mannogalactan content to stabilize the cloud therein.

7. A citrus juice product containing, as a minor constituent thereof, insufficient to materially increase the final beverage viscosity, a water soluble gum of high mannogalactan content of the class consisting of locust bean gum, tara gum, and guar gum, to stabilize the cloud therein.

8. A citrus juice product containing, as a minor constituent thereof insufficient to materially increase the final beverage viscosity, the water soluble gum of high mannogalactan content, locust bean gum, to stabilize the cloud therein.

9. A citrus juice product containing, as a minor constituent thereof, insufficient to materially increase the final beverage viscosity, the water soluble gum of high mannogalactan content, tara gum, to stabilize the cloud therein.

10. A citrus juice product containing, as a minor constituent thereof, insufficient to materially increase the final beverage viscosity, the water soluble gum of high mannogalactan content, guar gum, to stabilize the cloud therein.

11. A citrus beverage containing, as a minor constituent, insufficient to materially increase the viscosity thereof, the water soluble gum of high mannogalactan content, locust bean gum, to stabilize the cloud therein.

12. Concentrated citrus juice containing, as a minor constituent thereof, insufficient to materially increase the final beverage viscosity, the water soluble gum of high mannogalactan content, locust bean gum, to stabilize the cloud in beverage made therefrom.

13. A citrus beverage base containing, as a minor constituent thereof, insufficient to materially increase the final beverage viscosity, the water soluble gum of high mannogalactan content, locust bean gum, to stabilize the cloud in beverage made therefrom.

14. A citrus beverage syrup containing, as a minor constituent thereof, insufficient to materially increase the final beverage viscosity, the water soluble gum of high mannogalactan content, locust bean gum, to stabilize the cloud in beverage made therefrom.

JESSE W. STEVENS.
DAVID E. PRITCHETT.

REFERENCES CITED

The following references are of record in the file of this patent:

UNITED STATES PATENTS

| Number | Name | Date |
|---|---|---|
| 1,458,427 | McGeorge | June 12, 1923 |
| 2,007,218 | Seltzer | July 9, 1935 |

OTHER REFERENCES

"Water-Soluble Gums" by Mantell, 1947, pages 126 and 127.